United States Patent
Malone et al.

(10) Patent No.: US 11,284,025 B2
(45) Date of Patent: Mar. 22, 2022

(54) DIGITAL PIXEL HAVING HIGH SENSITIVITY AND DYNAMIC RANGE

(71) Applicant: Raytheon Company, Waltham, MA (US)

(72) Inventors: Neil R. Malone, Goleta, CA (US); Micky Harris, Lompoc, CA (US); Adam M. Kennedy, Goleta, CA (US); George Paloczi, Goleta, CA (US); John L. Vampola, Santa Barbara, CA (US); Christian M. Boemler, Goleta, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/890,483

(22) Filed: Jun. 2, 2020

(65) Prior Publication Data

US 2021/0377470 A1    Dec. 2, 2021

(51) Int. Cl.
*H04N 5/355*    (2011.01)
*H04N 5/378*    (2011.01)
*H04N 5/3745*   (2011.01)

(52) U.S. Cl.
CPC ....... *H04N 5/3559* (2013.01); *H04N 5/35509* (2013.01); *H04N 5/378* (2013.01); *H04N 5/37452* (2013.01); *H04N 5/37455* (2013.01)

(58) Field of Classification Search
CPC .. H04N 5/3559; H04N 5/37452; H04N 5/378; H04N 5/37455; H04N 5/35509
See application file for complete search history.

(56) References Cited

U.S. PATENT DOCUMENTS

| | | | |
|---|---|---|---|
| 5,886,659 A | 3/1999 | Pain et al. | |
| 6,462,687 B1 | 10/2002 | Eshraghi et al. | |
| 8,692,176 B2 * | 4/2014 | Kelly | H04N 5/378 250/208.1 |
| 9,854,192 B2 | 12/2017 | Boemler | |
| 2011/0291019 A1 * | 12/2011 | Yuan | G01T 1/247 250/370.09 |
| 2013/0193307 A1 * | 8/2013 | Sander | H04N 5/361 250/208.1 |

(Continued)

*Primary Examiner* — Nhan T Tran
(74) *Attorney, Agent, or Firm* — Burns & Levinson, LLP; Joseph M. Maraia

(57) ABSTRACT

A digital pixel includes a capacitive transimpedance amplifier (CTIA) coupled to a photodiode that receives an electrical charge and output an integration voltage. An integration capacitor coupled to the CTIA accumulates the integration voltage over an integration period. A comparator compares the accumulated integration voltage with a threshold voltage and generates a control signal at a first level each time the accumulated integration voltage is greater than the threshold voltage. A charge subtraction circuit receives the control signal at the first level and discharges the accumulated integration voltage each time the control signal at the first level is received from the comparator. An analog or digital counter receives the control signal at the first level and adjusts a counter value each time the control signal is received from the comparator. An output interface communicates the counter value to an image processing circuit at an end of the integration period.

18 Claims, 6 Drawing Sheets

(56) References Cited

U.S. PATENT DOCUMENTS

| | | | |
|---|---|---|---|
| 2014/0320716 A1* | 10/2014 | Huang | H04N 5/378 348/302 |
| 2015/0326805 A1* | 11/2015 | Scott | H04N 5/378 348/243 |
| 2017/0272678 A1* | 9/2017 | Sakakibara | H04N 5/37455 |
| 2017/0295333 A1* | 10/2017 | Boemler | H04N 5/378 |
| 2019/0268557 A1* | 8/2019 | Kawahito | H04N 5/3765 |
| 2020/0182983 A1* | 6/2020 | Calder | G01S 7/4863 |
| 2020/0200603 A1* | 6/2020 | Xu | H04N 5/37455 |

* cited by examiner

DIGITAL PIXEL HAVING HIGH SENSITIVITY AND DYNAMIC RANGE

TECHNICAL FIELD

This application relates generally to image sensors and, more particularly, to digital pixels for image sensors.

BACKGROUND

Image sensors are used by image capturing devices such as digital cameras and infrared imagers to capture images of an environment or terrain within the image sensor's field of view. A typical image sensor has an array of pixels and corresponding unit cells, referred to as a focal plane array that receives light via a lens. The received light is captured by each pixel of the array while a corresponding unit cell accumulates an electric charge proportional to the light intensity at each pixel. The term "pixel" can refer to the light capturing element or the smallest portion of a quantized image produced by the capturing element. In a focal plane array, the pixels and their corresponding unit cells are typically arranged in a two-dimensional array by columns and rows. Each unit cell includes electronic circuitry that accumulates an electrical charge from a photo-diode in their associated pixel. The electrical charge corresponds to the amount of flux of light of various wavelengths captured by the photo-diode in the associated pixel. A unit cell accumulates charge using an integration capacitor that integrates the accumulated charge over a time interval to produce a charge that is proportional of the flux intensity at a corresponding pixel for an integration period.

A unit cell typically includes an analog or digital readout integrated circuit (ROIC). A conventional analog ROIC couples a well capacitor to a pixel photo-diode. The well capacitor is used to integrate charge or current from the photo-diode over an integration period. At the end of each period, the voltage accumulated on the well capacitor is transferred to a sample-and-hold capacitor that transfers the voltage to an analog to digital converter (ADC). The ADC converts the analog voltage to a binary value.

A conventional digital unit cell typically includes a digital readout integrated circuit (DROIC) with an ADC that converts the accumulated charge from a pixel into a binary value. By including an ADC in the unit cell, the photo-charge capacity is improved with respect to an analog unit cell. A DROIC typically includes a quantizing analog front end circuit that accumulates charge on a capacitor that is fully or partial reset each time a threshold charge is reached on the capacitor. Each reset of the capacitor may be counted via a digital counter. At the end of each integration period or frame, the accumulated reset count is transferred to a register that is read out line by line to increase well capacity of a digital unit cell with respect to an analog unit cell. Additionally, any remaining residual charge on the integration capacitor can be digitized and transferred out at the end of the integration period or frame to improve the sensitivity of the pixel.

To improve dynamic range and low flux sensitivity, some image sensors use a digital pixel readout integrate circuit (DPROIC) that implements an ADC within each pixel or implements an ADC for a group of pixels. Some DPROICs have been implemented using direct injection (DI) circuits to improve image sensor dynamic range and well depth. Unfortunately, the range and sensitivity of these sensors remains somewhat limited because the DI becomes severely nonlinear at low irradiances. Another approach to improving dynamic range and sensitivity includes implementing unit cells with dual gain circuits that require switching or multiple focal planes. Unfortunately, switching adversely affects sensor performance by increasing noise, oscillations, or settling interference. Additional known techniques include operating image sensors with sun shades only when the sun is in a sensor's field of view, resulting in inconsistent performance or inadequate use of such sensors. Furthermore, existing image sensors often contend with design trade-offs such as providing faster frame rates, but at lower sensor sensitivity and higher data rates.

Dim target threats often require higher sensitivity where DI circuits have significant loss of response. Longer integration times are required for dim targets, where low response circuits are employed, to generate enough signal to overcome circuit noise. Longer integration times generally results in loss of desirable temporal signature data. Furthermore, existing image sensors are generally unable to image high flux and low flux targets simultaneously using a single image sensor.

SUMMARY

The application, in various implementations, addresses deficiencies associated with the sensitivity and dynamic range of image sensors.

This application describes an exemplary digital pixel arranged to provide wide dynamic range, deep well capacity, and high sensitivity. The exemplary digital pixel, in various implementations, provides: enhanced sensitivity at low fluxes of earth limb objects with low space backgrounds, simultaneous imaging of zero level fluxes and traditional saturated scenes, detection of dim targets even when the sun (or very high flux element) is in a partial field of view of an image sensor, and faster frame rates that are enabled by the higher response, low noise ROIC unit cell type. The exemplary digital pixel achieves such enhanced capabilities by implementing an in-pixel capacitive transimpedance amplifier (CTIA) arranged to receive electrical charge from a photodiode of the pixel, while outputting a digital reset count as well as a proportional electrical voltage within a DPROIC.

Such an implementation represents a substantial improvement with respect to, for example, in-pixel DI because the CTIA continues to operate at low irradiances or flux levels, unlike the DI that is unable to operate at these low levels. In other words, the in-pixel CTIA enables a substantial enhancement of low background sensitivity, with respect to current state of the art image sensors. The in-pixel CTIA also enables enhanced signal linearity along with a large well size provided via an in-pixel digital focal plane array (FPA) as opposed to conventional unit cells that typically require multiple FPAs or gain states. An exemplary DPROIC, including an in-pixel CTIA, further enables a ROIC that provides linear signal detection down to zero flux and gain and/or signal amplification that allows reduced integration time and reduced ROIC noise.

In some implementations, a CTIA digital pixel FPA circuit includes a CTIA counter with a greater than 10 ke– well while providing less than 20 e– of ROIC noise. A digital pixel including an in-pixel CTIA may be configured with up to a 22 bit counter or larger that enables an extremely large well capacity of, for example, 20 Me– or even beyond 1 Ge–. The exemplary CTIA digital pixel FPA can provide nonlinearity of less than 1% with an ROIC noise of less than 20 e–. The CTIA digital pixel FPA may include an array format within any range from a single pixel to array sizes of 2 k×2 k to 12 k×12 k format or greater. The exemplary digital pixel may include a 30 um, 20 um, 10 um pixel, or smaller. A digital pixel including an in-pixel CTIA may be manufactured using, for example, in a 90 nm fabrication process, or smaller, that increases available space for various electronic circuits. Such a configuration enables lower ROIC noise than any existing space-based medium wavelength infrared (MWIR) sensor, enables a larger well size than any existing space-based MWIR sensor, and enables a smaller MWIR pixel than any existing MWIR sensor. The various implementations described herein may also apply to sensors operating in other bands such as, without limitation, short wave infrared (SWIR) sensors and long wave infrared (LWIR) sensors. The various implementations described herein may apply to UV through LWIR sensors and/or multispectral sensors.

With respect to existing image sensors, the inventive in-pixel CTIA, in various implementations: can provide greater than 10 times the well size while allowing longer integration for dim targets without saturation on bright parts of a scene, provides greater than 4 times the sensitivity on earth limb targets, provides the ability to look at targets with the sun in same scene, minimizes electro optic (EO) jamming, and provides faster frame rates while integration times are reduced.

The description herein includes at least three general inventive concepts. First, each time a threshold is met, the full CTIA resets to zero signal value. This can impact recovery time of the CTIA coming out of reset and results in accumulated kTC noise for each reset, written out as SQRT (N*kTC). In this case, the capacitor being reset in the noise equation is the sum of the detector (which can be >10× feedback capacitor) and feedback capacitances. N is the number of resets in an image integration time. This is probably the least-complex and most generic form of this circuit. There is no subtraction capacitor involved in this process.

Second, each time a threshold is met, the output of the CTIA is sampled with a subtraction capacitor with one side of the capacitor tied to ground, and then the capacitor is released from the output and tied momentarily to the input. This provides a charge subtraction that keeps the CTIA operational without the settling and noise issues introduced by a full circuit reset in first concept above. In this case, the subtraction capacitor is smaller than the feedback to insure that the subtraction is not greater than the signal accumulated. The accumulated charge need not be fully reset. In some implementations, the circuit may perform partial resets where a known amount of signal charge is subtracted each time, but might not be 100%. For example, the circuit may subtract, or remove, a fixed amount of charge (such as half of the saturation value) each time the threshold is reached. This method, versus full reset of the circuit, may have advantages in speed (i.e., how long it takes to settle after subtraction) and noise (e.g., there can be significant 'kTC' noise generated each time the circuit is fully reset).

Third, each time a threshold is met, a small subtraction capacitor is disconnected from a reference voltage and momentarily tied to the input node at the detector. This injects a fixed charge that is opposite the charge generated by the scene via the detector. This has advantages of the second concept above. Since the reference voltage can be adjusted, so too can the amount of reset. This has an advantage over the second concept above, in that the reference voltage can be relatively high, and thus the subtraction capacitor can be smaller. Small subtraction, or reset capacitors, result in lower noise (known as kTC noise, where k=Boltzmann constant, T is temperature, and C is the value of the capacitor). More specifically written, the noise contribution from this capacitor is SQRT(N*kTC) each time there is a subtraction (N is the number of subtractions).

In one aspect, a digital pixel includes a detector and/or photodiode and a capacitive transimpedance amplifier coupled to the photodiode that is arranged to receive an electrical charge generated by the photodiode and output an integration voltage proportional to the electrical charge. The digital pixel also includes an integration capacitor coupled to the capacitive transimpedance amplifier that is configured to accumulate the integration voltage generated by the capacitive transimpedance amplifier over an integration period. The digital pixel includes a comparator coupled to the integration capacitor where the comparator is configured to compare the accumulated integration voltage across the integration capacitor with a threshold voltage and to generate a control signal at a first level each time a determination is made that the accumulated integration voltage across the integration capacitor is greater than the threshold voltage.

The digital pixel further includes a charge subtraction circuit coupled to the integration capacitor and to the comparator where the charge subtraction circuit is configured to receive the control signal at the first level from the comparator and configured to discharge a portion of, or all of the accumulated integration voltage on the integration capacitor each time the control signal at the first level is received from the comparator. The digital pixel includes at least one analog counter or digital counter coupled to the comparator and configured to receive the control signal at the first level from the comparator and adjust a counter value each time the control signal at the first level is received from the comparator. The digital pixel also includes an output interface arranged to communicate the counter value to an image processing circuit at an end of the integration period.

One of two types of counters may be implemented such as a digital counter that increments by '1' for each reset or an analog counter that accumulates a fixed amount of charge with each reset (which accumulates as an incremental voltage change on a capacitor). For the digital counter, which is digitally incremented each time a reset occurs, the digital value along with the analog residue may be transmitted from the unit cell where the residue may then converted to a digital value outside the unit cell. In some implementations, the analog value may be converted to a digital value within the unit cell. For an analog counter, each integrator reset generates a fixed amount of charge that is accumulated on a counter capacitor (i.e., each increment in voltage represents one reset). This analog signal is outputted at the end of integration along with the residue from the integrator. Both of these analog values may be converted to digital counts downstream of the unit cell. In some implementations, the analog values may be converted in the unit cell.

The at least one analog or digital counter may include an analog to digital converter. The at least one analog to digital counter may include a count capacitor such that the at least one analog to digital counter is arranged to adjust a fixed portion of charge from the count capacitor each time the at least one analog to digital counter receives the control signal at the first level from the comparator. The at least one analog to digital counter may further include a reset circuit configured to set the counter value to an initial value at a beginning of the integration period.

A charge subtraction circuit may be coupled to the integration capacitor and configured to receive a residual voltage from the integration capacitor at the end of the integration period. A residual readout circuit may be coupled to the integration capacitor and configured to output the residual voltage from the integration capacitor at the end of the integration period. An analog to digital converter may be coupled to the residual readout circuit and configured to output a binary residual value corresponding to the residual voltage from the residual readout circuit.

The output interface may be further arranged to communicate the counter value and binary residual value to the image processing circuit at an end of the integration period. The charge subtraction circuit may include a transistor circuit configured to remove a portion of, or all of the accumulated integration voltage on the integration capacitor each time the charge subtraction circuit receives the control signal at the first level from the comparator. The size of the integration capacitor may include a range of less than 0.1 fF to greater than 1 pF. The size of the integration capacitor may be less than or equal to about 10 pF, 5 pF, 1 pF, 500 fF, 200 fF, 100 fF, 50 fF, 20 fF, 10 fF, 5 fF, 2 fF, 1.5 fF, 1.4 fF, 1 fF, 0.5 fF, or 0.1 fF.

In some configurations, a digital pixel includes a charge subtraction circuit coupled to the integration capacitor and to an output of the comparator that is configured to receive the control signal at the first level from the comparator and to discharge the accumulated integration voltage, or a portion thereof, on the integration capacitor each time the control signal at the first level is received from the comparator. In another configuration, the charge subtraction circuit is coupled to an output of the comparator and an input of the capacitive transimpedance amplifier where the charge subtraction circuit is arranged to inject an electrical charge at the input of the capacitive transimpedance amplifier that is opposite the electrical charge from the photodiode. The charge subtraction circuit may include a subtraction capacitor and variable voltage input where the variable voltage input is adjustable to set a level of the electrical charge injected at the input of the capacitive transimpedance amplifier that is opposite the electrical charge from the photodiode.

In another aspect, a method for operating a digital pixel having a photodiode and an integration capacitor includes: generating an electrical charge in response to an input light signal incident on the photodiode over an integration period; receiving, by a capacitive transimpedance amplifier, the electrical charge; outputting, from the capacitive transimpedance amplifier, an integration voltage proportional to the electrical charge; accumulating the integration voltage on the integration capacitor; comparing the accumulated integration voltage across the integration capacitor with a threshold voltage; adjusting a counter value each time the voltage across the integration capacitor exceeds the threshold voltage; and outputting, at an end of the integration period, the counter value to an image processor. The method may include removing the all or part of the accumulated integration voltage on the integration capacitor each time the voltage across the integration capacitor exceeds the threshold voltage;

The method may further include: removing all or part of the accumulated charge on the integration capacitor includes coupling the integration capacitor to ground or a reset voltage; receiving, at a charge subtraction circuit, a residual voltage from the integration capacitor at the end of the integration period; outputting, by a residual readout circuit, the residual voltage from the integration capacitor at the end of the integration period; receiving, by an analog to digital converter, the residual voltage and outputting a binary residual value corresponding to the residual voltage from the residual readout circuit; communicating the counter value and binary residual value to the image processing circuit at an end of the integration period; and/or removing, by a charge subtraction circuit, the accumulated integration voltage on the integration capacitor each time the charge subtraction circuit receives the control signal at the first level from the comparator.

In a further aspect, an image sensor includes an image processing circuit and an array of digital pixels coupled to the image processing circuit. Each digital pixel may include a photodiode; a capacitive transimpedance amplifier coupled to the photodiode and arranged to receive an electrical charge generated by the photodiode and output a integration voltage proportional to the electrical charge; an integration capacitor coupled to the capacitive transimpedance amplifier and configured to accumulate the integration voltage generated by the capacitive transimpedance amplifier over an integration period; a comparator coupled to the integration capacitor and configured to compare the accumulated integration voltage across the integration capacitor with a threshold voltage and to generate a control signal at a first level each time a determination is made that the accumulated integration voltage across the integration capacitor is greater than the threshold voltage; at least one analog or digital counter coupled to the comparator and configured to receive the control signal at the first level from the comparator and adjust a counter value each time the control signal at the first level is received from the comparator; and an output interface arranged to communicate the counter value to an image processing circuit at an end of the integration period. A charge subtraction circuit may be coupled to the integration capacitor and to the comparator and configured to receive the control signal at the first level from the comparator and to discharge all of, or part of the accumulated integration voltage on the integration capacitor each time the control signal at the first level is received from the comparator.

Each digital pixel unit may further include a residual readout circuit arranged to output a residual voltage across the integration capacitor at the end of the integration period. The image processing circuit may be configured to calculate a total charge accumulated by each digital pixel unit based on the counter value and the binary residual value received from each digital pixel unit.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various aspects, addresses deficiencies associated the dynamic range and sensitivity of existing image sensors. The application includes exemplary apparatuses, systems and methods for implementing a digital pixel that provides: enhanced sensitivity at low fluxes of earth limb objects with low space backgrounds, simultaneous imaging of zero level fluxes and traditional saturated scenes, detection of dim targets even when the sun is in a partial field of view of an image sensor, and faster frame rates that are enabled by low ROIC noise which also allows for shorter integration time periods. The exemplary digital pixel achieves such enhanced capabilities by advantageous implementing an in-pixel capacitive transimpedance amplifier (CTIA) arranged to receive electrical charge from a photodiode of the digital pixel while outputting a proportional electrical voltage within a ROIC.

Figure 1:
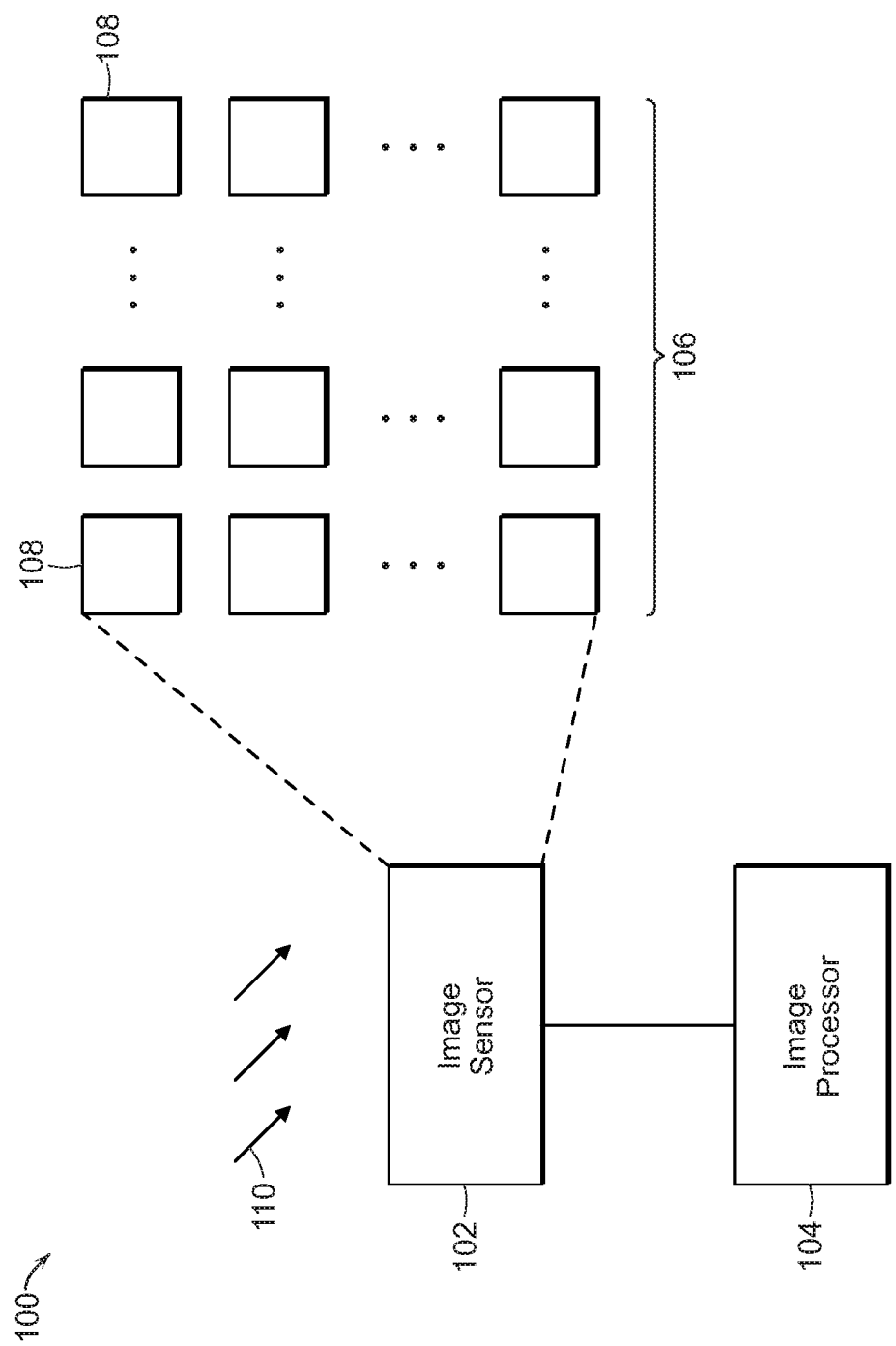
FIG. 1 is a block diagram of an image capture device.

FIG. 1 is a block diagram of an image capture device 100. Device 100 may be a digital camera, video camera, infrared imager or other photographic and/or image capturing equipment. Image capture device 100 may include an image sensor 102 and image processing unit 104. Image sensor 102 may include a charge-coupled device (CCD), CMOS sensor, Active Pixel Sensor (APS), an HgCdTe detector, and/or other suitable light sensing device that can capture images. Image processing unit 104 may include a combination of hardware, software, and/or firmware that is operable to receive signal information from image sensor 102 and convert the signal information into a digital image or to extract information from the data. Image sensor 102 may include high dynamic range digital pixels 108 that enable radiometric measurements of hot targets in a cold background and low noise equivalent differential temperature (NEDT) imaging under all radiometric conditions. In addition to large well capacity, digital pixels 108 may enable high dynamic range imaging via a digital-in-pixel architecture with both counter and residue that provides low read noise. By implementing an in-pixel CTIA, the integration capacitor of each digital pixel 108 can be sized such that read noise is lower than an analog pixel or DI pixel in the same pixel pitch. A low noise floor is beneficial in signal starved conditions, such as high frame rate operations and when viewing cold targets. Low NEDT in high signal conditions is also beneficial for discriminating between objects with small temperature differences.

Image sensor 102 may include an array 106 of digital pixels 108. Each digital pixel accumulates charge proportional to the intensity of light 110 at that location in the field of view of image sensor 102 and provides an indication of the intensity of light 110 at that location to the image processing unit 104. Each digital pixel 108 may correspond to a pixel in a captured electronic image from image sensor 102. In one implementation, array 106 includes a 1280×720 array of digital pixels 108. The size of each digital pixel 108 may be less than or equal to about 100 um, 50 um, 20 um, 10 um, 5 um, and 1 um. In some implementations, size of each digital pixel is greater than 100 um. The well capacity of each digital pixel 108 may be greater than or equal to about 500 Me-, 750 Me-, 1 Ge-, or 2 Ge-.

One technique for image capture by image capture device 100 includes ripple capture. Ripple capture is a method that captures each row of digital pixels from image sensor 102 in sequential order. For example, ripple capture may expose the top row of digital pixels 108 of image sensor 102 to light, followed by the second row, followed by the third row, and so forth until the last row of digital pixels 108 of image sensor 102 is exposed to light 110. Image processing unit 104 may receive pixel information captured by image sensor 102 via a ripple read technique that processes each row of digital pixels 108 from image sensor 102 in order. Similar to ripple capture, ripple read may process the top row of digital pixels 108 of image sensor 102, followed by the second row, followed by the third row, and so forth until the last row of digital pixels 108 of image sensor 102 is processed. A ripple reset operation to reset the rows of digital pixels 108 of image sensor 102 may be performed similarly.

These methods may be performed on consecutive rows. For example, a ripple capture operation may begin with the first row of array 106. As the ripple capture operation moves to the second row, a ripple read operation may begin on the first row of array 106. After the ripple capture operation moves to the third row, the ripple read operation may begin on the second row and a ripple reset operation may begin on the first row. This may continue until the last row is processed. Once the last row is processed, the image may be processed, stored, and/or transmitted by the image processing unit 104.

Figure 2:
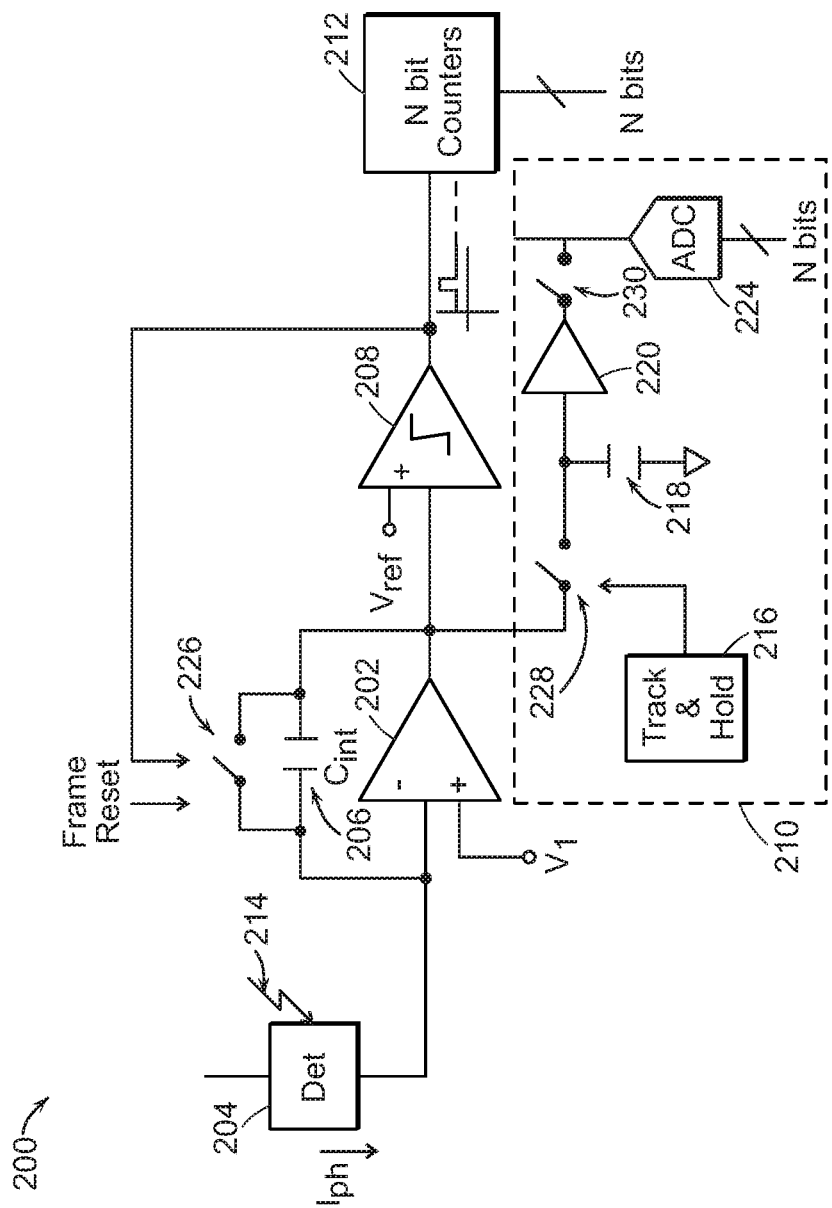
FIG. 2 is a simplified schematic diagram of a digital pixel circuit including an in-pixel capacitive transimpedance amplifier including a residual readout circuit.

FIG. 2 is a simplified schematic diagram of a digital pixel circuit 200 including an in-pixel capacitive transimpedance amplifier (CTIA) 202. Circuit 200 also includes a detector 204 which may be a photodiode, an integration capacitor 206, comparator 208, a residual readout circuit 210, frame reset switch 226, and an N-bit counter 212. In one implementation, residual readout circuit 210 includes a track and hold circuit 216, residual capture switch 228, residual signal capacitor 218, buffer 220, switch 230, and analog to digital converter (ADC) 224. A counter residue architecture such as in circuit 200 may reduce supply noise and power by reducing digital pixel activity. ADC 224 may output a 1 to N bit value corresponding to an analog voltage output from buffer 220. ADC 224 may be located within the unit cell of each digital pixel such as digital pixel 200 of an array. ADC 224 may be located outside each digital pixel 200 and shared among a group of digital pixels (normally neighboring groups of columns). Buffer 220 may be located within digital pixel 200 and have a switch 230 going to a shared bus (normally a column buss) that allows each residue from a group of digital pixels to be routed to, and digitized by ADC 224.

In operation, CTIA 202 is coupled to detector 204 and arranged to receive an electrical charge and/or photon current ($I_{ph}$) generated by detector and/or photodiode 204 in response to incident light and/or photon 214. CTIA 202 then outputs an integration voltage proportional to the electrical charge and/or photon current. Integration capacitor 206 is coupled to the output of CTIA 202 and configured to accumulate the integration voltage generated by CTIA 202 over an integration period.

Comparator 208 is coupled to integration capacitor 206 and configured to compare the accumulated integration voltage across integration capacitor 206 with a threshold or reference voltage ($V_{ref}$). The size of integration capacitor 206 may include a range of less than 0.1 fF to greater than 1 pF. The size of integration capacitor 206 may be less than or equal to about 10 pF, 5 pF, 1 pF, 500 fF, 200 fF, 100 fF, 50 fF, 20 fF, 10 fF, 5 fF, 2 fF, 1.5 fF, 1.4 fF, 1 fF, 0.5 fF, or 0.1 fF. Comparator 208 generates a control signal and/or pulse at a first level each time a determination is made that the accumulated integration voltage across integration capacitor 206 is greater than the threshold voltage. Comparator 208 may include a pulse frequency modulation (PFM) comparator and/or a sigma-delta ADC. The control signal and/or pulse output from comparator 208 may control frame reset switch 226 to reset the integration voltage to an initial value.

Residual readout circuit 210 may be coupled to integration capacitor 206 and be configured to output a residual voltage from integration capacitor 206 at the end of an integration period. An N-bit ADC 224 may be coupled to integration capacitor 206 and a residual capacitor 218 via buffer 220 and switch 230. ADC 224 may be configured to output an N-bit binary residual value, e.g., a 1 to 16-bit value, corresponding to the residual voltage from the residual readout circuit 210. Circuit 200 may be configured with an output interface arranged to communicate the counter value from counter 212 and binary residual value from residual readout circuit 210 as, for example, a combined N-bit output value to an image processing circuit such as circuit 104 at an end of the integration period. Track and hold circuit 216 may control switch 228 to hold the residual voltage at the end of an integration period and/or frame.

Digital counter 212 may be replaced by an analog counter. In such a configuration, every time a reset pulse is generated, a fixed amount of charge is dumped on a capacitor via a charge pump, resulting in a metered, or known, step increase in the voltage on the capacitor. An analog voltage value is read out at the end of the full integration time or integration period, digitized by a shared analog to digital converter, and then the capacitor is reset. The ADC may be located within digital pixel 200. In such a configuration, every unit cell and/or digital pixel would have an ADC. The digital value resulting from the step size that has been digitized may be transmitted off a focal plane or may be done on an FPA. The digital value may be converted back to a count representing the number of resets that occurred using, for example, a calibrated algorithm rather than representing the analog voltage value. The digital value may then be combined with the residue from residual readout circuit 210 to form a large-bit (high dynamic range) representation of the pixel irradiance.

Digital pixel circuit 200 may be implemented without residual readout circuit 210. In such an implementation, output from digital pixel 200 is based on the output of counter 212. In this instance, the size of integration capacitor 206 may be 1.4 fF, QLSB=2000 e−, well depth and/or capacity=130 Me−, and BG=15.6×1015 ph/cm$^2$/s→126 Ge−/s for a 30 um pixel/QE=0.9. The pixel counting rate may be about 63 MHz with counter transistor transitions=256×256×63M×2×5=41T gate-event/s. Digital pixel size may be 30 um based on, for example, a 65 nm CMOS and/or MOSFET fabrication process.

In an implementation where digital pixel circuit 200 includes residual readout circuit 210, the size of integration capacitor 206 may be less than or equal to about 100 fF, QLSB=1Me−, well depth and/or capacity=1 Ge−. The pixel counting rate using residue readout circuit 210 may be reduced to about 144 kHz with comparator transistor transitions=256×256×114k×2×5=75 G gate-event/s. Digital pixel size may be 30 um based on, for example, a 90 nm CMOS and/or MOSFET fabrication process. Hence, digital pixel circuit 200, i.e., a residual digital pixel, may substantially reduce digital switching activity by about 500 times with respect to, for example, digital pixel circuit 200 without residue readout circuit 210.

In some implementations, circuit 200 achieves >500 Me− well capacity with the use of a digital pixel ROIC architecture. An ROIC including, for example CTIA 202 may achieve >1 Ge− well capacity. Whereas an analog pixel saturates once the integration capacitor charge capacity has been exceeded, a digital pixel including circuit 200 has additional circuitry that resets the integration capacitor 206 either fully or partially each time it fills and increments an in-pixel counter such as counter 212. At the end of a frame, counter 212 indicates how many times integration capacitor 206 has been filled to a certain integration voltage level. At the end of each frame, the counter value indicates the amount of signal integrated. Reading out the counter value alone neglects to account for the residual charge in integration capacitor 206 and leads to increased quantization noise, which is a drawback of digital pixels with an integration capacitor sized around 1-2 fF.

A digital only pixel with a counter least significant bit (LSB) threshold of 4000 e− has a quantization noise of LSB/√12=1160 e− RMS. Quantization noise can be minimized by limiting the size of the integrator well capacity (small LSB counter threshold) or by reading out and digitizing the residual charge, (i.e. residue value) with the counter value every frame. A counter residue architecture takes the latter approach.

As previously discussed, counter value and digitized residual charge on integration capacitor 206 may be combined to determine the total signal accumulated charge during an integration period, which may be based on a counter residue calibration algorithm. A counter, such as counter 212, provides the large well capacity and the digitization of residual charge on an integrator and/or integration capacitor (residue), provides a low noise floor. Dynamic range can thus be tuned for particular applications such as: the number of counter bits (in combination with integrator capacity) determines well capacity while integrator well capacity determines the noise floor. Thus, well capacity and noise floor can be independently optimized during the ROIC design phase.

This is in contrast to an analog pixel in which well capacity is increased at the detriment of noise floor because integrator well capacity drives read noise. The read noise associated with the counter residue architecture may be more complex than an analog pixel. There is a noise term associated with each residual digitization and an additional noise term associated with each count. The total read noise is the root sum squared of the residual and counter noise, where the counter noise contributes for each count during any given frame. The integrator and/or integration capacitor may be sized such that shot noise is the dominant noise mechanism by the first count and, therefore, counter-induced read noise is not a detriment to performance.

In digital pixel 200 where residual readout circuit 210 is included, each time a threshold is met, the full digital pixel 200 may be reset to zero signal value. This can impact recovery time of CTIA 202 coming out of reset and may result in accumulated kTC noise for each reset, written out as SQRT(N*kTC). In this instance, the capacitor being reset in the noise equation is the sum of the detector (which can be >10× feedback capacitor) and feedback capacitances 206. N is the number of resets in an image integration time. Circuit 200 may be the least-complex form of a CTIA-based digital pixel circuit. There is no subtraction capacitor involved in the circuit 200 configuration or process.

Figure 3:
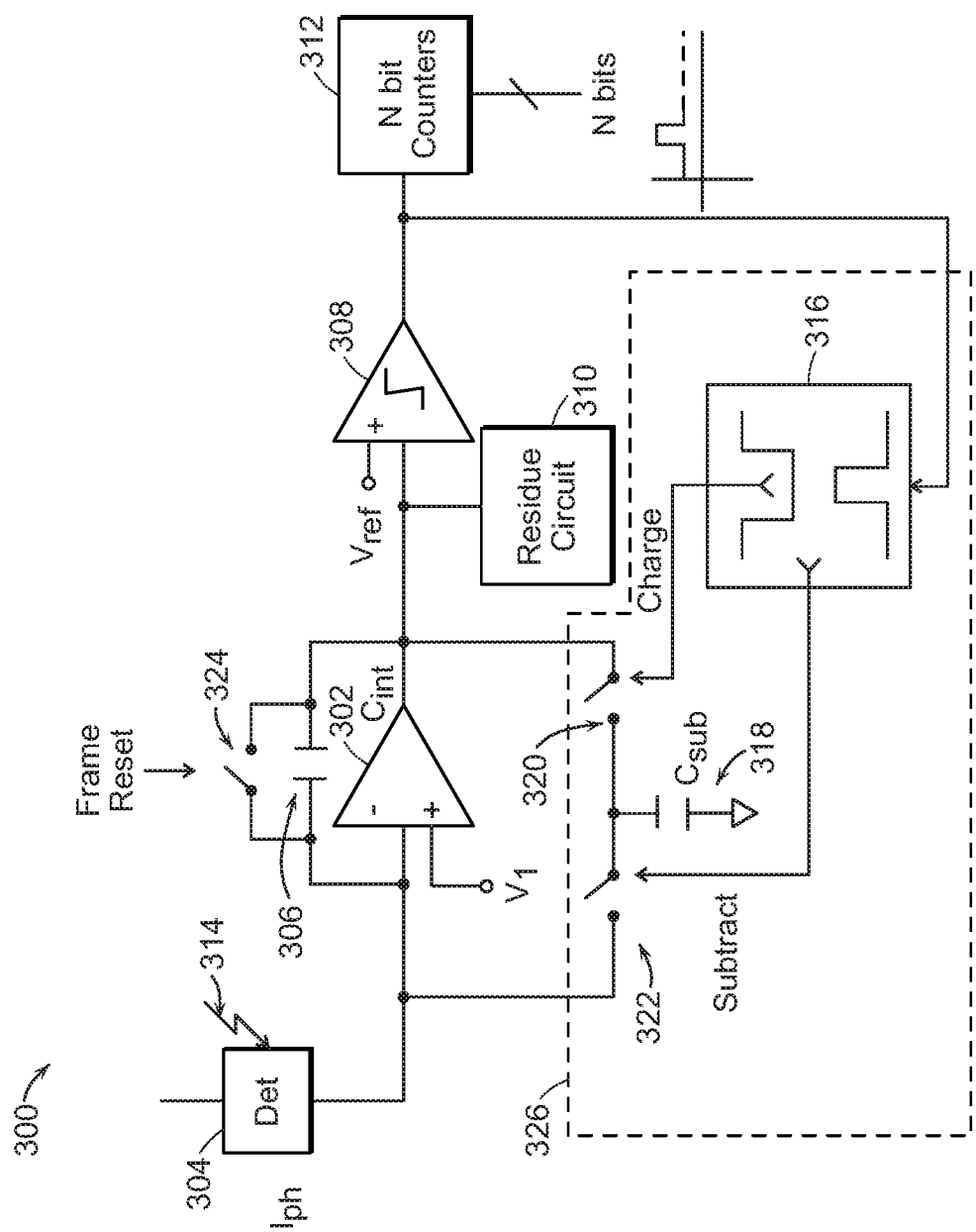
FIG. 3 is a simplified schematic diagram of a digital pixel circuit including an in-pixel capacitive transimpedance amplifier with a residual readout circuit and a charge subtraction circuit.

FIG. 3 is a simplified schematic diagram of a digital pixel circuit 300 including an in-pixel CTIA 302, residual readout circuit 310, and charge subtraction circuit 326. A counter residue architecture such as in circuit 300 may reduce supply noise and power by reducing digital pixel activity. Circuit 300 includes detector and/or photodiode 304, integration capacitor 306, comparator 308, frame reset switch 324, a N-bit digital counter 312, and a residual readout circuit 310. Charge subtraction circuit 326 includes charge subtraction capacitor 318, charge subtraction timing generator 316, charge switch 320, and subtract switch 322.

In operation, CTIA 302 is coupled to photodiode 304 and arranged to receive an electrical charge and/or photon current generated by photodiode 304 in response to incident light and/or photon 314. CTIA 302 then outputs an integration voltage proportional to the electrical charge and/or photon current. Integration capacitor 306 is coupled to the output of CTIA 302 and configured to accumulate the integration voltage generated by CTIA 302 over an integration period. Each time a threshold is met, the output of the CTIA 302 is sampled with a subtraction capacitor 318 where one side of capacitor 318 may be connected to ground or another voltage value. Then capacitor 318 is released from the output of CTIA 302 via switch 320 and tied momentarily to the input of CTIA 302 via switch 322. This provides a charge subtraction that keeps CTIA 302 operational without the settling and noise issues introduced by a full circuit reset associated, for example, with circuit 200.

In this case, subtraction capacitor 318 may be smaller than the feedback to insure that the subtraction is not greater than the signal accumulated. In some implementations, a slightly larger capacitor may be used. Hence, the accumulated charge and/or voltage on integration capacitor 306 need not be fully reset. In some implementations, circuit 300 may perform partial resets where a known amount of signal charge is subtracted each time, which may be less than 100%. For example, circuit 300 may subtract, or remove, a fixed amount of charge (such as half of the saturation value) each time a threshold is reached. This method, versus full reset as in circuit 200, may have advantages in speed (i.e., how long it takes to settle after subtraction) and noise (e.g., there can be significant 'kTC' noise generated each time the circuit is fully reset).

Comparator 308 is coupled to integration capacitor 306 and configured to compare the accumulated integration voltage across integration capacitor 306 with a threshold or reference voltage. The size of integration capacitor 306 may include a range of less than 0.1 fF to greater than 1 pF. The size of integration capacitor 306 may be less than or equal to about 10 pF, 5 pF, 1 pF, 500 fF, 200 fF, 100 fF, 50 fF, 20 fF, 10 fF, 5 fF, 2 fF, 1.5 fF, 1.4 fF, 1 fF, 0.5 fF, or 0.1 fF. Comparator 308 generates a control signal and/or control pulse at a first level each time a determination is made that the accumulated integration voltage across the integration capacitor 306 is greater than the threshold voltage. Charge subtraction circuit 326 may be coupled to the output of comparator 308 and receive the control signal from comparator 308 to control the timing of the operation of switches 320 and 322. The lead edge timing of the control pulse from comparator 308 may correspond to the lead edge timing of one or both of a charge pulse or subtract pulse output from charge subtraction timing generator 316.

Comparator 308 may include a pulse frequency modulation (PFM) comparator and/or a sigma-delta ADC. Charge subtraction circuit 326 may include a transistor circuit configured to remove the accumulated integration voltage, or a portion thereof, on integration capacitor 306 each time the charge subtraction circuit 326 receives the control signal at the first level from comparator 308.

In one implementation, counter 312 is coupled to comparator 308 and configured to receive the control signal at the first level from comparator 308 and increment a digital counter value each time the control signal at the first level is received from comparator 308. Counter 312 may include multiple serial stages arranged to output a counter value in the range of, for example, 1 to 16 bits, or greater, based on the control signal from comparator 308. The operation of comparator 308 with counter 312 may be considered an analog to digital conversion. Circuit 300 may include an output interface arranged to communicate the N-bit counter value to an image processing circuit at an end of the integration period.

In one implementation, residual readout circuit 310 is coupled to integration capacitor 306 and configured to receive a residual voltage from integration capacitor 306 at the end of the integration period. Residual readout circuit 310 may include one or more components of and operate in the same manner as residual readout circuit 210. Residual readout circuit 310 may be coupled to integration capacitor 306 and be configured to output the residual voltage from integration capacitor 306 at the end of an integration period. A N-bit analog to digital converter may be included within or outside of residual readout circuit 310 and be configured to output a N-bit binary residual value, e.g. 1-12 bits, corresponding to the residual voltage from the residual readout circuit 310. Circuit 300 may be configured with an output interface arranged to communicate the counter value and binary residual value as, for example, a combined N-bit output value (e.g., 22-bits) to an image processing circuit such as circuit 104 at an end of the integration period.

Digital counter 312 may be replaced by an analog counter. In such a configuration, every time a reset pulse is generated, a fixed amount of charge is dumped on a capacitor via a charge pump, resulting in a metered, or known, step increase in the voltage on the capacitor. An analog voltage value is read out at the end of the full integration time or integration period, digitized by a shared analog to digital converter, and then the capacitor is reset. The ADC may be located within digital pixel 300. In such a configuration, every unit cell and/or digital pixel would have an ADC. The digital value resulting from the step size that has been digitized may be transmitted off a focal plane or may be done on an FPA. The digital value may be converted back to a count representing the number of resets that occurred using, for example, a calibrated algorithm rather than representing the analog voltage value. The digital value may then be combined with the residue to form a large-bit (high dynamic range) representation of the pixel irradiance.

In one implementation, the size of integration capacitor 306 is less than or equal to about 100 fF, QLSB=1Me–, well depth and/or capacity=1 Ge–. The pixel counting rate using residue readout circuit 306 may be reduced to about 144 kHz with comparator transistor transitions=256×256×114k×2×5=75 G gate-event/s. Digital pixel size may be 30 um based on, for example, a 90 nm CMOS and/or MOSFET fabrication process. Hence, digital pixel circuit 300, i.e., a residue digital pixel, may substantially reduce digital switching activity by about 500 times with respect to, for example, digital pixel circuit 200.

In some implementations, circuit 300 achieves >500 Me– well capacity with the use of a digital pixel ROIC architecture. An ROIC including, for example CTIA 302 may achieve >1 Ge– well capacity. Whereas an analog pixel saturates once the integration capacitor charge capacity has been exceeded, a digital pixel including circuit 300 has additional circuitry that resets the integration capacitor 306 each time it fills and increments an in-pixel counter such as counter 312. At the end of a frame, the counter 312 indicates how many times the integration capacitor 306 has been filled with certain integration voltage level. At the end of each frame, the counter value indicates the amount of signal integrated. Reading out the counter value alone neglects to account for the residual charge in the integration capacitor 306 and leads to increased quantization noise, which is a drawback of digital pixels with an integration capacitor sized around 1-2 fF.

A digital only pixel with a counter least significant bit (LSB) threshold of 4000 e− has a quantization noise of LSB/$\sqrt{12}$=1160 e− RMS. Quantization noise can be minimized by limiting the size of the integrator well capacity (small LSB counter threshold) or by reading out and digitizing the residual charge, (i.e. residue value) with the counter value every frame. A counter residue architecture takes the latter approach.

In some implementations, counter value and digitized residual charge on the integration capacitor 306 are combined to determine total signal accumulated charge during an integration period, which may be based on a counter residue calibration algorithm. The counter, such as counter 312, provides the large well capacity and the digitization of residual charge on an integrator and/or integration capacitor (residue), provides a low noise floor. Dynamic range can thus be tuned for particular applications such as: number of counter bits (in combination with integrator capacity) determines well capacity while integrator well capacity determines the noise floor. Thus, well capacity and noise floor can be independently optimized during the ROIC design phase.

This is in contrast to an analog pixel in which well capacity is increased at the detriment of noise floor because integrator well capacity drives read noise. The read noise associated with the counter residue architecture may be more complex than an analog pixel. There is a noise term associated with each residual digitization and an additional noise term associated with each count. The total read noise is the root sum squared of the residual and counter noise, where the counter noise contributes for each count during any given frame. The integrator and/or integration capacitor may be sized such that shot noise is the dominant noise mechanism by the first count and, therefore, counter-induced read noise is not a detriment to performance.

Figure 4:
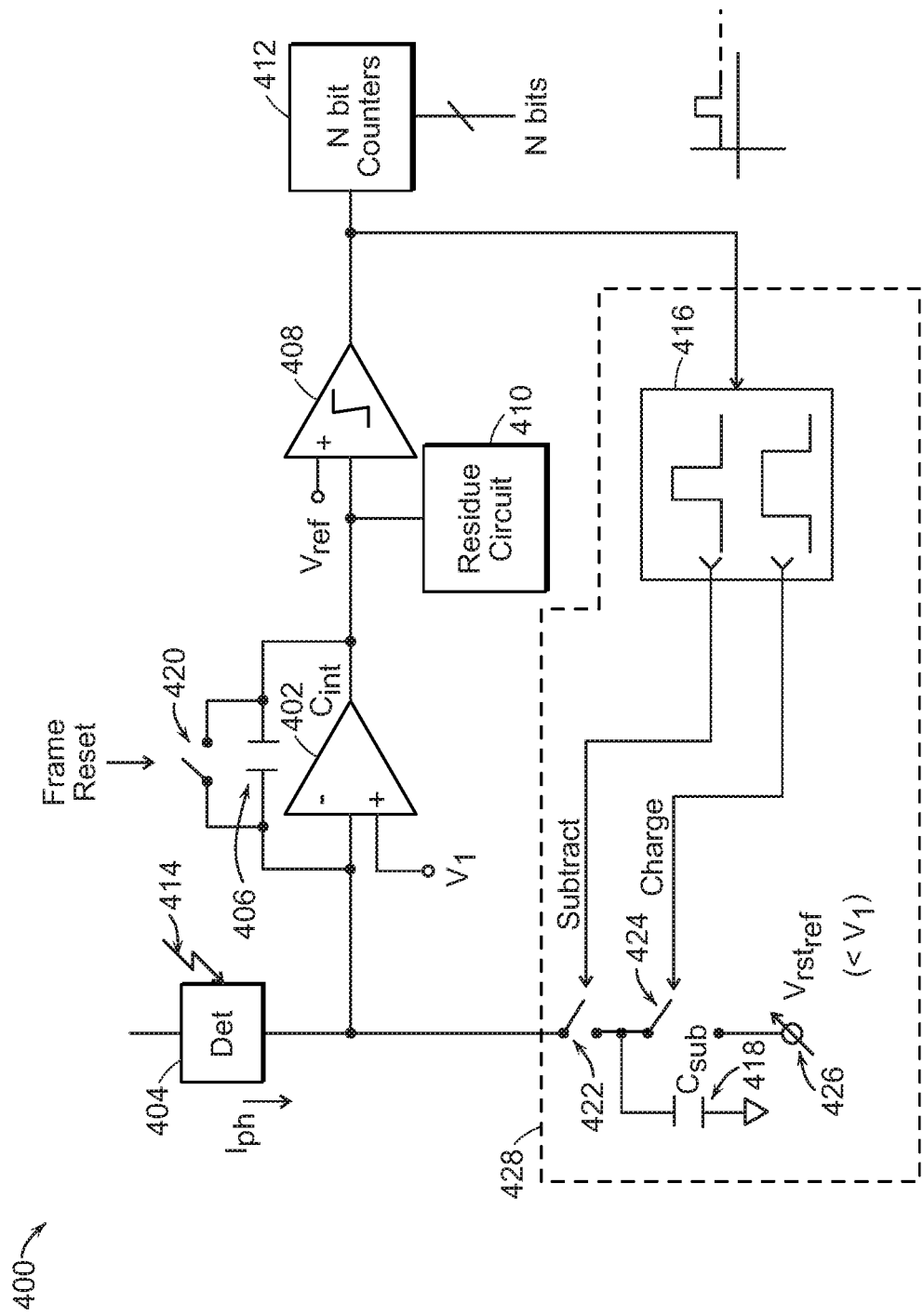
FIG. 4 is a simplified schematic diagram of another digital pixel circuit including an in-pixel capacitive transimpedance amplifier with a residual readout circuit and charge subtraction circuit.

FIG. 4 is a simplified schematic diagram of another digital pixel circuit 400 including an in-pixel CTIA 402, residual readout circuit 410, and charge subtraction circuit 428. A counter residue architecture such as in circuit 400 may reduce supply noise and power by reducing digital pixel activity. Circuit 400 also includes detector and/or photodiode 404, integration capacitor 406, frame reset switch 420, comparator 408, a N-bit digital counter 412, and a residual readout circuit 410. Charge subtraction circuit 428 may include a charge subtraction timing generator 416, charge subtraction capacitor 418, charge switch 424, and subtract switch 422. Circuit 400 further includes variable reset reference voltage input 426.

In operation, CTIA 402 is coupled to photodiode 404 and arranged to receive an electrical charge and/or photon current generated by photodiode 404 in response to incident light and/or photon 414. CTIA 402 then outputs an integration voltage proportional to the electrical charge and/or photon current. Integration capacitor 406 is coupled to the output of CTIA 402 and configured to accumulate the integration voltage generated by CTIA 402 over an integration period. Each time a threshold is met, the output of comparator 408 provides a control signal and/or pulse to charge subtraction circuit 428. Charge subtraction capacitor 418 is coupled to variable reset reference voltage input 426. The voltage setting at input 426 may be set to a level less than the voltage level Vi at the positive input of CTIA 402. Capacitor 418 is released from input 426 via charge switch 424 and tied momentarily to the input of CTIA 402 via subtract switch 422. This provides a charge subtraction that keeps CTIA 402 operational without the settling and noise issues introduced by a full circuit reset associated, for example, with circuit 200.

Subtraction capacitor 418 may be smaller than the feedback to reduce noise associated in the charge subtraction process ('kTC' noise). The accumulated charge and/or voltage on integration capacitor 406 need not be fully reset. In some implementations, circuit 400 may perform partial resets where a known amount of signal charge is subtracted each time, which may be less than 100%. For example, circuit 400 may subtract, or remove, a fixed amount of charge (such as half of the saturation value) each time a threshold is reached. This method, versus full reset as in circuit 200, may have advantages in speed (i.e., how long it takes to settle after subtraction) and noise (e.g., there can be significant 'kTC' noise generated each time the circuit is fully reset).

Furthermore, each time a threshold is met, a small subtraction capacitor 418 is disconnected from the reset reference voltage input 426 and momentarily tied to the input node at the detector 404 and CTIA 402. This injects a fixed charge that is opposite the charge generated by the scene via the detector 404. This has the same advantages of circuit 300. Since the reference voltage input 426 can be adjusted, so too can the amount of reset. This has an advantage over circuit 300, in that the reference voltage input 426 can be relatively high, and thus the subtraction capacitor 418 can be smaller. A small subtraction and/or reset capacitor 418 results in lower noise (known as kTC noise, where k=Boltzmann constant, T is temperature, and C is the value of the capacitor). More specifically written, the noise contribution from this capacitor is SQRT(N*kTC) where N is the number of subtractions.

Comparator 408 is coupled to integration capacitor 406 and configured to compare the accumulated integration voltage across integration capacitor 406 with a threshold or reference voltage. The size of integration capacitor 406 may include a range of less than 0.1 fF to greater than 1 pF. The size of integration capacitor 406 may be less than or equal to about 10 pF, 5 pF, 1 pF, 500 fF, 200 fF, 100 fF, 50 fF, 20 fF, 10 fF, 5 fF, 2 fF, 1.5 fF, 1.4 fF, 1 fF, 0.5 fF, or 0.1 fF. Comparator 408 generates a control signal and/or control pulse at a first level each time a determination is made that the accumulated integration voltage across the integration capacitor 406 is greater than the threshold voltage. Charge subtraction circuit 428 may be coupled to the output of comparator 408 and receive the control signal from comparator 408 to control the timing of the operation of switches 422 and 424. The lead edge timing of the control pulse from comparator 408 may correspond to the lead edge timing of one or both of a charge pulse or subtract pulse output from charge subtraction timing generator 416.

Comparator 408 may include a pulse frequency modulation (PFM) comparator and/or a sigma-delta ADC. Charge subtraction circuit 428 may include a transistor circuit configured to remove the accumulated integration voltage, or a portion thereof, on integration capacitor 406 each time the charge subtraction circuit 428 receives the control signal at the first level from comparator 408.

In one implementation, counter 412 is coupled to comparator 408 and configured to receive the control signal at the first level from comparator 408 and increment a digital counter value each time the control signal at the first level is received from comparator 408. Counter 412 may include multiple serial stages arranged to output a counter value in the range of, for example, 1 to 16 bits, or greater, based on the control signal from comparator 408. The operation of comparator 408 with counter 412 may be considered an analog to digital conversion. Circuit 400 may include an output interface arranged to communicate the N-bit counter value to an image processing circuit at an end of the integration period.

In one implementation, residual readout circuit 410 is coupled to integration capacitor 406 and configured to receive a residual voltage from integration capacitor 406 at the end of the integration period. Residual readout circuit 410 may include one or more components of and operate in the same manner as residual readout circuit 210 and/or 310. Residual readout circuit 410 may be coupled to integration capacitor 406 and be configured to output the residual voltage from integration capacitor 406 at the end of an integration period. A N-bit analog to digital converter may be included within or outside of residual readout circuit 410 and be configured to output a N-bit binary residual value, e.g. 1-12 bits, corresponding to the residual voltage from the residual readout circuit 410. Circuit 400 may be configured with an output interface arranged to communicate the counter value and binary residual value as, for example, a combined N-bit output value (e.g., 22-bits) to an image processing circuit such as circuit 104 at an end of the integration period.

Digital counter 412 may be replaced by an analog counter. In such a configuration, every time a reset pulse is generated, a fixed amount of charge is dumped on a capacitor via a charge pump, resulting in a metered, or known, step increase in the voltage on the capacitor. An analog voltage value is read out at the end of the full integration time or integration period, digitized by a shared analog to digital converter, and then the capacitor is reset. The ADC may be located within digital pixel 400. In such a configuration, every unit cell and/or digital pixel would have an ADC. The digital value resulting from the step size that has been digitized may be transmitted off a focal plane or may be done on an FPA. The digital value may be converted back to a count representing the number of resets that occurred using, for example, a calibrated algorithm rather than representing the analog voltage value. The digital value may then be combined with the residue to form a large-bit (high dynamic range) representation of the pixel irradiance. As previously discussed, digital pixel circuit 400 provides the advantages associated with digital pixel circuit 300 but with additional advantages associated with implementing a variable reset reference voltage input 426.

Figure 5:
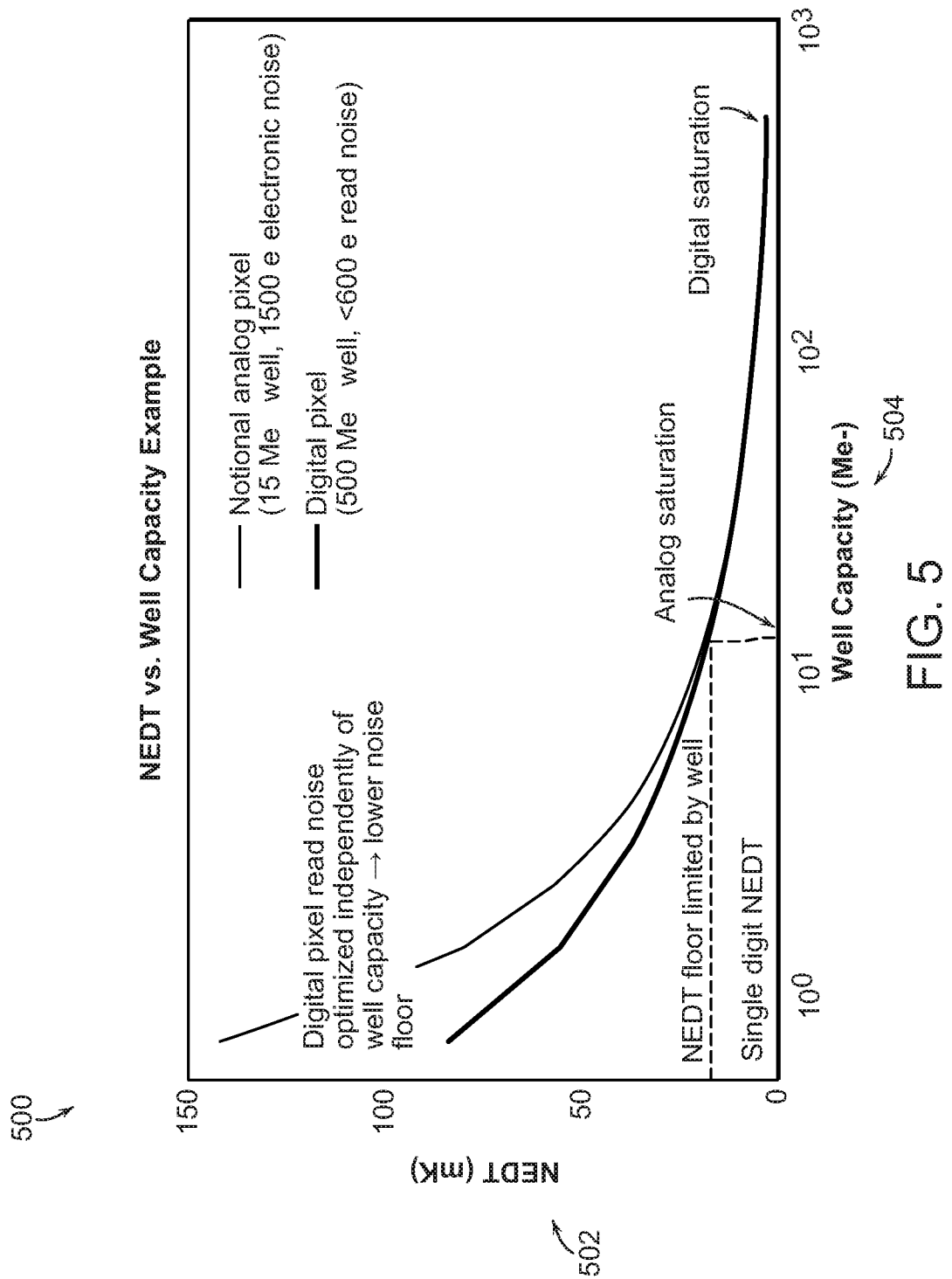
FIG. 5 shows a graph of NEDT versus well capacity for a digital pixel including an in-pixel capacitive transimpedance amplifier.

FIG. 5 shows a graph 500 of NEDT 502 versus well capacity 504 for a digital pixel. NEDT is the input referred change in scene temperature that represents a signal to noise of one, with respect to the noise from that pixel. FIG. 5 illustrates the substantial improvement in sensitivity and dynamic range provided by a digital pixel with respect to a conventional analog pixel. According to graph 500, an analog pixel has a well depth of about 15 Me– with about 1500 e– of electronic noise. A digital pixel, in contrast, has a well depth of about 500 Me– with less than 600 e– of read noise. While a digital pixel enables higher sensitivity with respect to an analog pixel, replacing a DI with a CTIA further increases the sensitivity.

Figure 6:
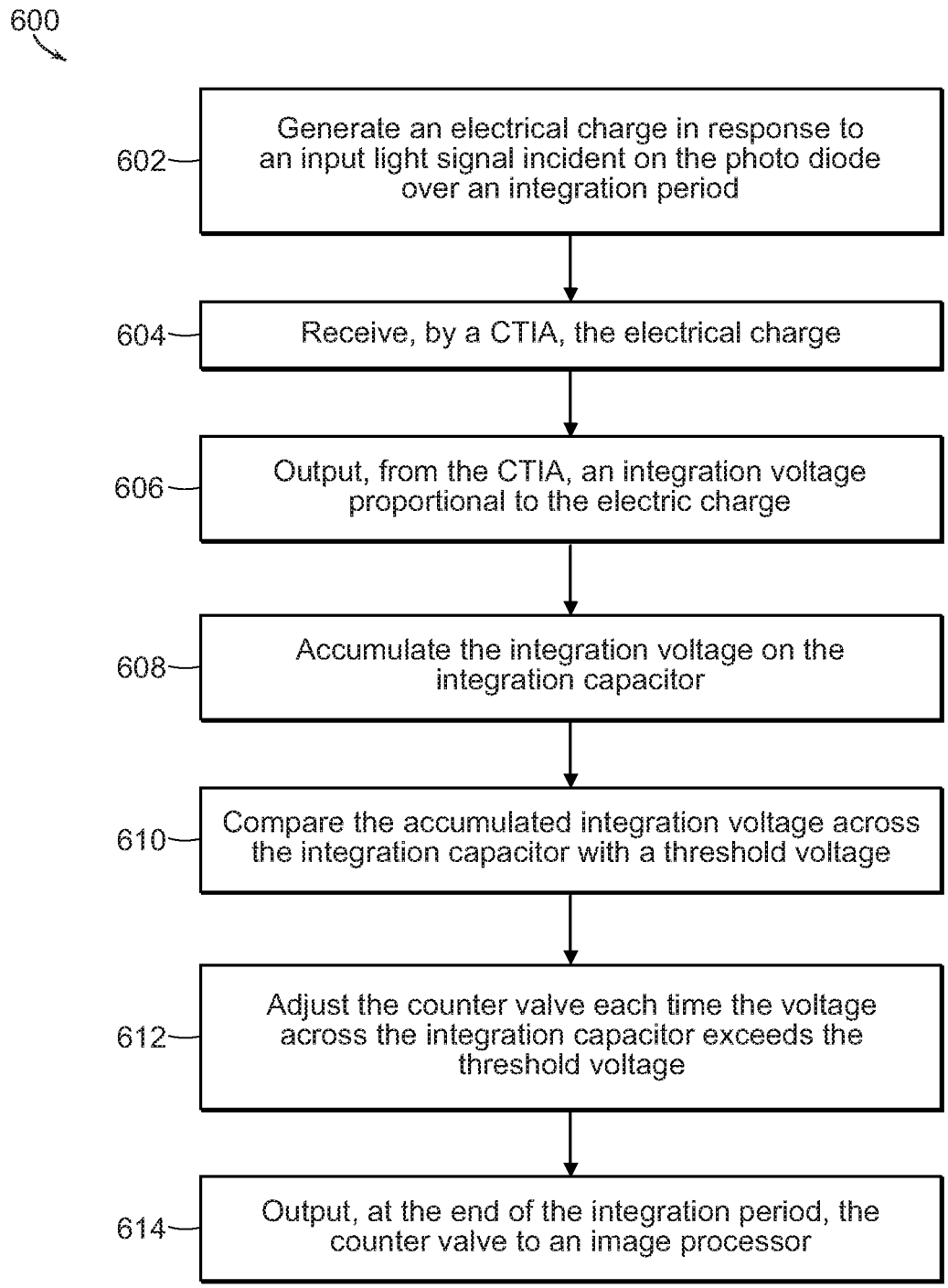
FIG. 6 includes a process for operating a digital pixel having a photodiode and an integration capacitor.

FIG. 6 includes a process 600 for operating a digital pixel having a photodiode and an integration capacitor including: generating an electrical charge in response to an input light signal incident on the photodiode over an integration period (Step 602); receiving, by a capacitive transimpedance amplifier, the electrical charge (Step 604); outputting, from the capacitive transimpedance amplifier, an integration voltage proportional to the electrical charge (Step 606); accumulating the integration voltage on the integration capacitor (Step 608); comparing the accumulated integration voltage across the integration capacitor with a threshold voltage (Step 610); adjusting a counter value and subtract integrated charge each time the voltage across the integration capacitor exceeds the threshold voltage (Step 612); and outputting, at an end of the integration period, the counter value to an image processor (Step 614). The process may include removing the accumulated integration voltage on the integration capacitor each time the voltage across the integration capacitor exceeds the threshold voltage in Step 612. The process may further include: receiving, at a charge subtraction circuit, a residual voltage from the integration capacitor at the end of the integration period; outputting, by a residual readout circuit, the residual voltage from the integration capacitor at the end of the integration period; receiving, by an analog to digital converter, the residual voltage and outputting a binary residual value corresponding to the residual voltage from the residual readout circuit; and communicating the counter value and binary residual value to the image processing circuit at an end of the integration period.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A digital pixel comprising:
 a photodiode;
 a capacitive transimpedance amplifier coupled to the photodiode and arranged to receive an electrical charge generated by the photodiode and output an integration voltage proportional to the electrical charge;
 an integration capacitor coupled to the capacitive transimpedance amplifier and configured to accumulate the integration voltage generated by the capacitive transimpedance amplifier over an integration period;
 a comparator coupled to the integration capacitor and configured to compare the accumulated integration voltage across the integration capacitor with a threshold voltage and to generate a control signal at a first level each time a determination is made that the accumulated integration voltage across the integration capacitor is greater than the threshold voltage;
 a charge subtraction circuit coupled to an output of the comparator and an input of the capacitive transimpedance amplifier, wherein the charge subtraction circuit is arranged to inject an electrical charge at the input of the capacitive transimpedance amplifier that is opposite the electrical charge from the photodiode;

a counter coupled to the comparator and configured to receive the control signal at the first level from the comparator and adjust a counter value each time the control signal at the first level is received from the comparator; and an output interface arranged to communicate the counter value to an image processing circuit at an end of the integration period.

2. The digital pixel of claim 1, comprising a residual readout circuit coupled to the integration capacitor and configured to output a residual voltage from the integration capacitor at the end of the integration period.

3. The digital pixel of claim 2, further comprising an analog to digital converter coupled to the residual readout circuit and configured to output a binary residual value corresponding to the residual voltage from the residual readout circuit.

4. The digital pixel of claim 3, wherein the output interface is further arranged to communicate the counter value and binary residual value to the image processing circuit at an end of the integration period.

5. The digital pixel of claim 1, wherein the counter includes an analog counter having a count capacitor and wherein the analog counter is arranged to adjust a fixed portion of charge from the count capacitor each time the analog counter receives the control signal at the first level from the comparator.

6. The digital pixel of claim 1, wherein the counter includes a reset circuit configured to set the counter value to an initial value at a beginning of the integration period.

7. The digital pixel of claim 1 comprising a charge subtraction circuit coupled to the integration capacitor and to an output of the comparator and configured to receive the control signal at the first level from the comparator and to discharge the accumulated integration voltage, or a portion thereof, on the integration capacitor each time the control signal at the first level is received from the comparator.

8. The digital pixel of claim 1, wherein the charge subtraction circuit includes a subtraction capacitor and variable voltage input, the variable voltage input being adjustable to set a level of the electrical charge injected at the input of the capacitive transimpedance amplifier that is opposite the electrical charge from the photodiode.

9. The digital pixel of claim 1, wherein the size of the integration capacitor is less than or equal to about one of 10 pF, 5 pF, 1 pF, 500 fF, 200 fF, 100 fF, 50 fF, 20 fF, 10 fF, 5 fF, 2 fF, 1.5 fF, 1.4 fF, 1 fF, 0.5 fF, and 0.1 fF.

10. A method for operating a digital pixel having a photodiode and an integration capacitor, the method comprising:

generating a first electrical charge in response to an input light signal incident on the photodiode over an integration period;

receiving, by a capacitive transimpedance amplifier, the first electrical charge;

injecting, from a charge subtraction circuit, a second electrical charge at the input of the capacitive transimpedance amplifier that is opposite the first electrical charge from the photodiode;

outputting, from the capacitive transimpedance amplifier, an integration voltage proportional to a sum of the first electrical charge and the second electric charge;

accumulating the integration voltage on the integration capacitor;

comparing the accumulated integration voltage across the integration capacitor with a threshold voltage;

adjusting a counter value each time the voltage across the integration capacitor exceeds the threshold voltage; and outputting, at an end of the integration period, the counter value to an image processor.

11. The method of claim 10 comprising removing the accumulated integration voltage, or a portion thereof, on the integration capacitor each time the voltage across the integration capacitor exceeds the threshold voltage.

12. The method of claim 10 comprising receiving, at a residual readout circuit, residual voltage from the integration capacitor at the end of the integration period.

13. The method of claim 12, comprising outputting, by a residual readout circuit, the residual voltage from the integration capacitor at the end of the integration period.

14. The method of claim 13, further comprising receiving, by an analog to digital converter, the residual voltage and outputting a binary residual value corresponding to the residual voltage from the residual readout circuit.

15. The method of claim 14 comprising communicating the counter value and binary residual value to the image processing circuit at an end of the integration period.

16. The method of claim 10 comprising removing, by a charge subtraction circuit, the accumulated integration voltage on the integration capacitor each time the charge subtraction circuit receives the control signal at the first level from the comparator.

17. An image sensor comprising:
an image processing circuit; and
an array of digital pixels coupled to the image processing circuit, each digital pixel including:
a photodiode;
a capacitive transimpedance amplifier coupled to the photodiode and arranged to receive an electrical charge generated by the photodiode and output a integration voltage proportional to the electrical charge;
an integration capacitor coupled to the capacitive transimpedance amplifier and configured to accumulate the integration voltage generated by the capacitive transimpedance amplifier over an integration period;
a comparator coupled to the integration capacitor and configured to compare the accumulated integration voltage across the integration capacitor with a threshold voltage and to generate a control signal at a first level each time a determination is made that the accumulated integration voltage across the integration capacitor is greater than the threshold voltage;
a charge subtraction circuit coupled to an output of the comparator and an input of the capacitive transimpedance amplifier, wherein the charge subtraction circuit is arranged to inject an electrical charge at the input of the capacitive transimpedance amplifier that is opposite the electrical charge from the photodiode;
a counter coupled to the comparator and configured to receive the control signal at the first level from the comparator and adjust a counter value each time the control signal at the first level is received from the comparator; and
an output interface arranged to communicate the counter value to an image processing circuit at an end of the integration period.

18. The image sensor of claim 17, wherein each digital pixel unit further includes a residual readout circuit arranged to output a residual voltage across the integration capacitor at the end of the integration period and wherein the image processing circuit is configured to calculate a total charge accumulated by each digital pixel unit based on the counter value and the binary residual value received from each digital pixel unit.

* * * * *